United States Patent
De Wit

(10) Patent No.: US 9,006,639 B2
(45) Date of Patent: Apr. 14, 2015

(54) PIXEL ARCHITECTURE WITH THE CONTROL TERMINAL OF A FIRST SWITCH COUPLED TO THE CONTROL TERMINAL OF A SECOND SWITCH AND METHOD

(75) Inventor: Yannick De Wit, Aartselaar (BE)

(73) Assignee: Semiconductor Components Industries, LLC, Phoenix, AZ (US)

( * ) Notice: Subject to any disclaimer, the term of this patent is extended or adjusted under 35 U.S.C. 154(b) by 194 days.

(21) Appl. No.: 13/642,101

(22) PCT Filed: Apr. 21, 2011

(86) PCT No.: PCT/US2011/033388
§ 371 (c)(1),
(2), (4) Date: Nov. 21, 2012

(87) PCT Pub. No.: WO2011/133749
PCT Pub. Date: Oct. 27, 2011

(65) Prior Publication Data
US 2013/0032697 A1    Feb. 7, 2013

Related U.S. Application Data

(60) Provisional application No. 61/326,251, filed on Apr. 21, 2010.

(51) Int. Cl.
*H01J 40/14*    (2006.01)
*H04N 5/374*    (2011.01)
*H04N 5/3745*    (2011.01)

(52) U.S. Cl.
CPC .......... *H04N 5/3741* (2013.01); *H04N 5/3745* (2013.01)

(58) Field of Classification Search
USPC ........ 250/214 R, 214.1, 208.1; 348/294–311; 257/290–292, 440
See application file for complete search history.

(56) References Cited

U.S. PATENT DOCUMENTS 8,729,451 B2 *    5/2014    Bikumandla ............. 250/214 R

* cited by examiner

*Primary Examiner* — Que T Le
(74) *Attorney, Agent, or Firm* — Rennie William Dover

(57) ABSTRACT

In accordance with an embodiment, a pixel includes at least two switches, each switch having a control terminal and first and second current carrying terminals. The control terminals of the first and second switches are commonly connected together. In accordance with another embodiment, a method for transferring charge from a first switch to a capacitance includes applying voltage to the commonly connected control terminals of the first and second switches.

14 Claims, 12 Drawing Sheets

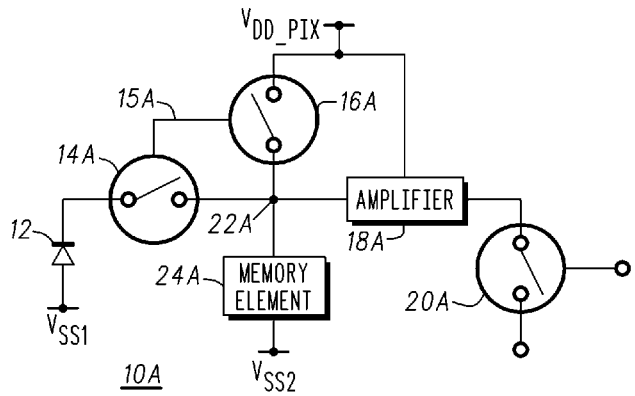
FIG. 1
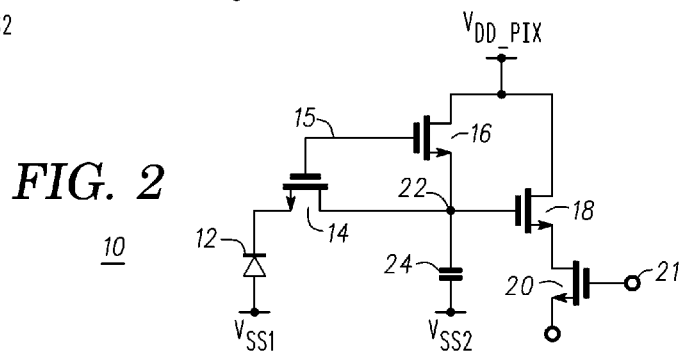
FIG. 2
FIG. 3
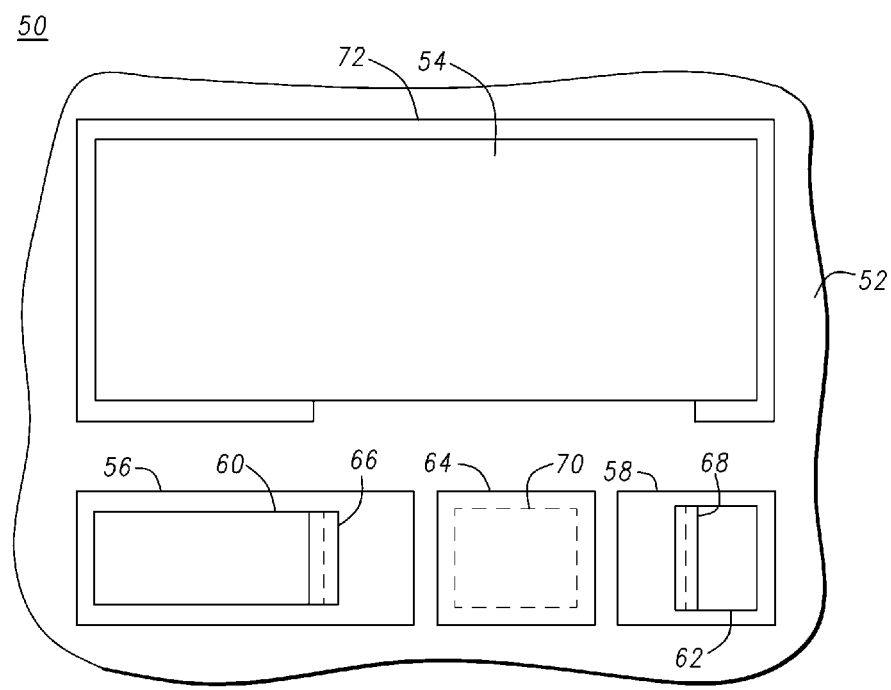

PIXEL ARCHITECTURE WITH THE CONTROL TERMINAL OF A FIRST SWITCH COUPLED TO THE CONTROL TERMINAL OF A SECOND SWITCH AND METHOD

BACKGROUND

The present invention relates, in general, to electronics and, more particularly, to image sensors.

In the past, the electronics industry used solid-state image sensors to form camera systems. The pixels were configured into an array of rows and columns and contained photosensitive elements. Image sensors are disclosed in U.S. Patent Application Publication No. 2007/0236590 A1 by Brannon Harris and published on Oct. 11, 2007, U.S. Patent Application Publication No. 2008/0079830 A1 by Gerald Lepage and published on Apr. 3, 2008, and U.S. Pat. No. 7,772,627 B2 issued to Sungkwon C. Hong on Aug. 10, 2010. A drawback with these systems is their parasitic current leakages and parasitic light sensitivities.

Accordingly, it would be advantageous to have a pixel and method for operating the pixel having improved performance parameters. In addition, it is desirable for the method and circuit to be cost and time efficient to implement.

BRIEF DESCRIPTION OF THE DRAWINGS

The present invention will be better understood from a reading of the following detailed description, taken in conjunction with the accompanying drawing figures, in which like reference characters designate like elements and in which:

FIG. 1 is a circuit schematic of a pixel in accordance with an embodiment of the present invention;

FIG. 2 is a circuit schematic of a pixel in accordance with another embodiment of the present invention;

FIG. 3 is a top view of the pixel of FIG. 2 during manufacture in accordance with an embodiment of the present invention;

Figure 4:
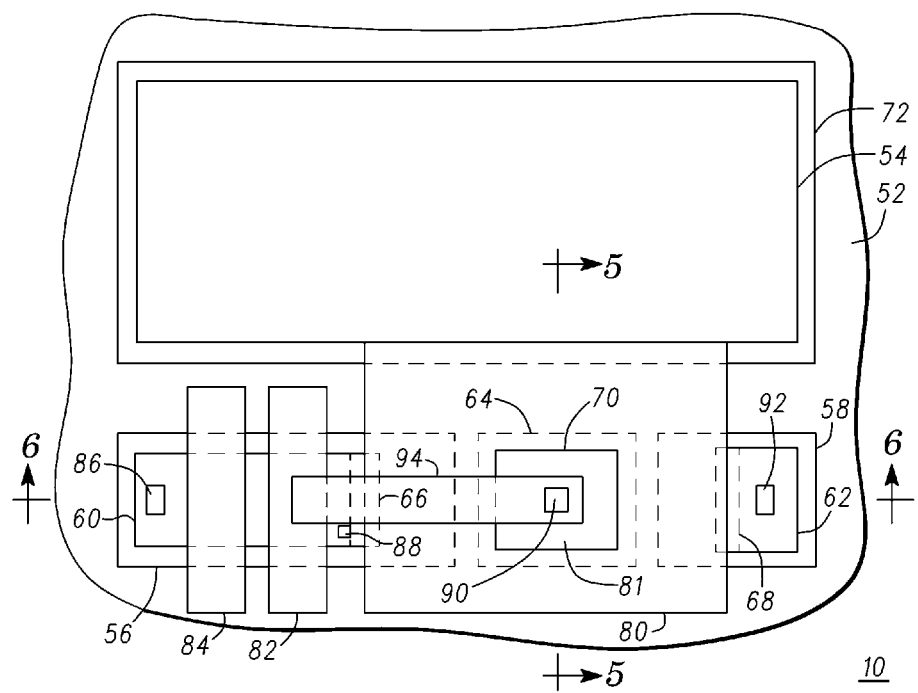
FIG. 4 is a top view of the pixel of FIG. 3 during manufacture in accordance with an embodiment of the present invention.

For simplicity and clarity of illustration, elements in the figures are not necessarily to scale, and the same reference characters in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or an anode of a diode, and a control electrode means an element of the device that controls current flow through the device such as a gate of an MOS transistor or a base of a bipolar transistor. Although the devices are explained herein as certain N-channel or P-channel devices, or certain N-type or P-type doped regions, a person of ordinary skill in the art will appreciate that complementary devices are also possible in accordance with embodiments of the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated. It is well established in the art that variances of up to about ten percent (10%) (and up to twenty percent (20%) for semiconductor doping concentrations) are regarded as reasonable variances from the ideal goal of exactly as described.

It should be noted that a logic zero voltage level ($V_L$) is also referred to as a logic low voltage and that the voltage level of a logic zero voltage is a function of the power supply voltage and the type of logic family. For example, in a Complementary Metal Oxide Semiconductor (CMOS) logic family a logic zero voltage may be thirty percent of the power supply voltage level. In a five volt Transistor-Transistor Logic (TTL) system a logic zero voltage level may be about 0.8 volts, whereas for a five volt CMOS system, the logic zero voltage level may be about 1.5 volts. A logic one voltage level ($V_H$) is also referred to as a logic high voltage level and, like the logic zero voltage level, the logic high voltage level also may be a function of the power supply and the type of logic family. For example, in a CMOS system a logic one voltage may be about seventy percent of the power supply voltage level. In a five volt TTL system a logic one voltage may be about 2.4 volts, whereas for a five volt CMOS system, the logic one voltage may be about 3.5 volts.

DETAILED DESCRIPTION

Generally the present invention provides an image sensor and a method for operating the image sensor.

FIG. 1 is a circuit schematic of a pixel 10A in accordance with another embodiment of the present invention. Pixel 10A is comprised of photodiode 12, a transfer switch 14A, a reset switch 16A, a select switch 18A, and a memory element 24A. Each of switches 14A-20A has a control terminal and a pair of current carrying terminals. The control terminals of transfer switch 14 and reset switch 16 are commonly connected together to form a node 15A that may be coupled for receiving a control signal $V_{TRRE}$. Transfer switch 14A has a current carrying terminal connected to a cathode of photodiode 12 and a current carrying terminal commonly connected to a current carrying terminal of reset switch 16A, an input terminal of amplifier 18A, and a terminal of memory element 24A to form a node 22A. The other current carrying terminal of reset switch 16A is coupled for receiving source of operating potential such as, for example, $V_{DD\_PIX}$. The control terminal of transfer switch 14 is coupled for receiving a control signal $V_{TRRE}$ and the control terminal of reset switch 16 is coupled for receiving a control signal $V_{RES}$. The anode of photodiode 12 is coupled for receiving a source of operating potential $V_{SS1}$ and a terminal of memory element 24A is coupled for receiving source of operating potential $V_{SS2}$. By way of example, sources of operating potential $V_{SS1}$ and $V_{SS2}$ are at ground potential. It should be noted that the voltage levels of sources of operating potential $V_{SS1}$ and $V_{SS2}$ are not limitations of the present invention. For example, sources of operating potential $V_{SS1}$ and $V_{SS2}$ may be at the same voltage level or at different voltage levels. Amplifier 18A has a current carrying terminal connected to an output of amplifier 22A and a control terminal coupled for receiving a control signal $V_{SEL}$.

FIG. 2 is a circuit schematic of a pixel 10 in accordance with an embodiment of the present invention. Pixel 10 is comprised of a photodiode 12, a transfer transistor 14, a reset transistor 16, a source follower transistor 18, and a select transistor 20. By way of example, photodiode 12 is a pinned photodiode capable of being fully depleted at a depletion voltage $V_{PIN}$ and transistors 14-20 are Metal Oxide Field Effect Transistors (MOSFETs), where each transistor has a gate, a drain, and a source. More particularly, the gate of transfer transistor 14 is connected to the gate of reset transistor 16 to form a node 15 and the drain of transfer transistor 14 is commonly connected to the source of reset transistor 16 and to the gate of source follower transistor 18 to form a node 22.

The source of transfer transistor 14 is connected to a terminal of photodiode 12 and the other terminal of photodiode 12 is coupled for receiving a source of operating potential $V_{SS1}$. By way of example source of operating potential $V_{SS}$ is ground.

Node 22 is connected to source of operating potential $V_{SS2}$ through a capacitor 24 and may be referred to as a floating diffusion node. The drains of reset transistor 16 and source follower transistor 18 are commonly coupled for receiving a source of operating potential $V_{DD\_PIX}$. The source of source follower transistor 18 is connected to the drain of select transistor 20. The gate 21 of select transistor 20 is coupled for receiving a select voltage $V_{SEL}$. Although the current carrying electrode of select transistor 20 that is connected to the source of source follower transistor 18 has been identified as a drain, it should be noted that select transistor 20 is a symmetric device in which the type of terminal, drain or source, is a function of the bias voltages applied to them. Although transistors 14-20 have been shown as N-channel devices, i.e., NMOS devices, this is not a limitation of the present invention. For example, the transistors may be P-channel devices, junction field effect transistors, bipolar transistors, or the like. Because the gates of transfer transistor 14 and reset transistor 16 are commonly connected, the configuration may be referred to as a common gate pixel or a common gate 4T pixel.

FIG. 3 is a top view of pixel 10 during manufacture in accordance with an embodiment of the present invention. What is shown in FIG. 3 is a portion of a semiconductor chip 50 comprising a semiconductor material 52 which can be of P-type conductivity or N-type conductivity. A photodiode region 72 and doped regions 56 and 58 are formed in portions of semiconductor material 52. A doped region 60 is formed in doped region 56, a doped region 62 is formed in doped region 58, and a doped region 64 is formed between and laterally spaced apart from doped regions 56 and 58. A doped region 66 is formed in a portion of doped region 56 and a portion of doped region 60 and a doped region 68 is formed in a portion of doped regions 58 and a portion of doped region 62. A doped region 70 extends from doped region 64 into semiconductor material 52. By way of example, doped regions 60, 62, 64, 66, 68, and 70 are of opposite conductivity type to doped regions 56 and 58. More particularly, semiconductor material 52 may be an epitaxial layer of P-type conductivity formed over a semiconductor substrate of P-type conductivity (not shown), doped regions 56 and 58 may be regions doped with an impurity material of P-type conductivity, and doped regions 60, 62, 64, 66, 68, and 70 may be regions doped with an impurity material of N-type conductivity. Doped regions 64, 66, and 68 are typically lightly doped drain regions and doped region 70 is a floating diffusion region which may form a portion of a floating diffusion capacitor. In addition, FIG. 3 illustrates a shallow doped region 54 formed in doped region 72. In accordance with embodiments in which doped region 54 is a region of n-type conductivity, doped region 54 is of p-type conductivity which buries the diode region thereby forming a fully depleted or pinned photodiode.

FIG. 4 is a top view of pixel 10 of FIG. 4 during manufacture. What is shown in FIG. 4 are gate structures 80, 82, 84, contacts 86, 88, 90, 92, and an interconnect 94. It should be noted that interconnect 94 couples doped region 64 with gate structure 82. It should be further noted that a gate structure is comprised of a gate electrode and a gate dielectric material. The gate electrode and gate dielectric materials are illustrated in the drawings and collectively referred to as a gate structure. The gate structure is referred to as a gate in the figures containing circuit schematics. With reference to FIGS. 2 and 4, gate structure 80 serves as a common gate structure for transfer transistor 14 and reset transistor 16, gate structure 82 serves as the gate structure for source follower transistor 18, and gate structure 84 serves as the gate structure for select transistor 20. Gate structure 80 is a ring-shaped or donut-shaped structure with an opening 81 in a central portion.

Figure 5:
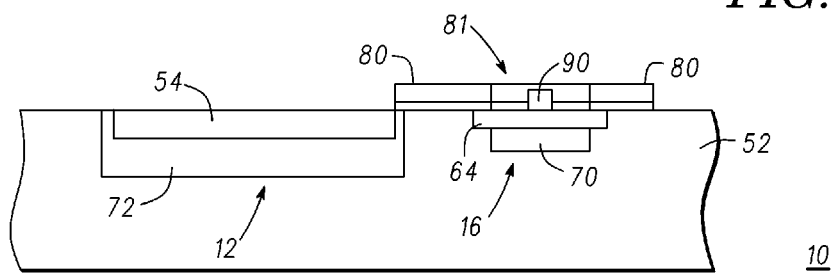
FIG. 5 is a cross-sectional view of the pixel of FIG. 4 taken along section line 5-5 of FIG. 4 in accordance with an embodiment of the present invention.

FIG. 5 is a cross-sectional view of pixel 10 taken along section line 5-5 of FIG. 4. FIG. 5 illustrates a cross-sectional view of photodiode 12, transfer transistor 14, common gate structure 80, and opening 81 in the central region or portion of common gate structure 80. For the sake of clarity, interconnect 94 has been omitted from FIG. 5. Photodiode 12 is laterally adjacent transfer transistor 14 and floating diffusion capacitor 24. A floating diffusion region 70, which serves as a portion of floating diffusion capacitor 24, is below opening 81 of common gate structure 80. A contact 90 is formed in contact with source region 64 of reset transistor 16 and a contact 92 is formed in contact with drain region 62 of select transistor 16.

Figure 6:
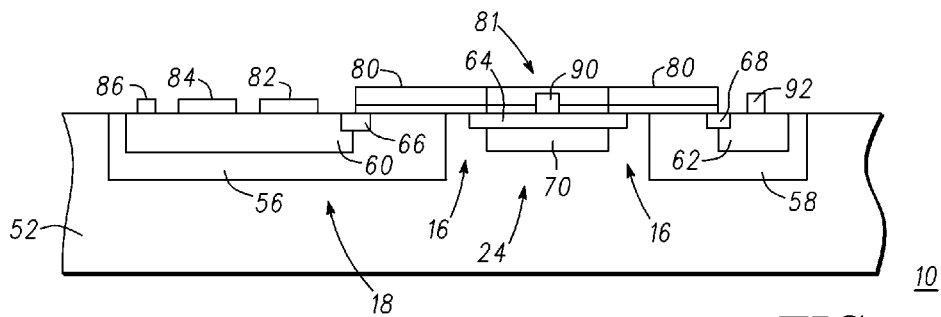
FIG. 6 is a cross-sectional view of the pixel of FIG. 4 taken along section line 6-6 of FIG. 4 in accordance with an embodiment of the present invention.

FIG. 6 is a cross-sectional view of pixel 10 taken along section line 6-6 of FIG. 4. FIG. 6 illustrates transfer transistor 14 and reset transistor 16 having a common gate structure 80 with opening 81, source follower transistor 18 having gate structure 82 and select transistor 20 having gate structure 84. Floating diffusion region 70, which serves as a portion of floating diffusion capacitor 24, is laterally adjacent reset transistor 16. A contact 90 is formed in contact with source region 64 of reset transistor 16, a contact 92 is formed in contact with drain region 62 of select transistor 16, and a contact 86 is formed in contact with the drain region of select transistor 20. For the sake of clarity, interconnect 94 has been omitted from FIG. 6.

Figure 7:
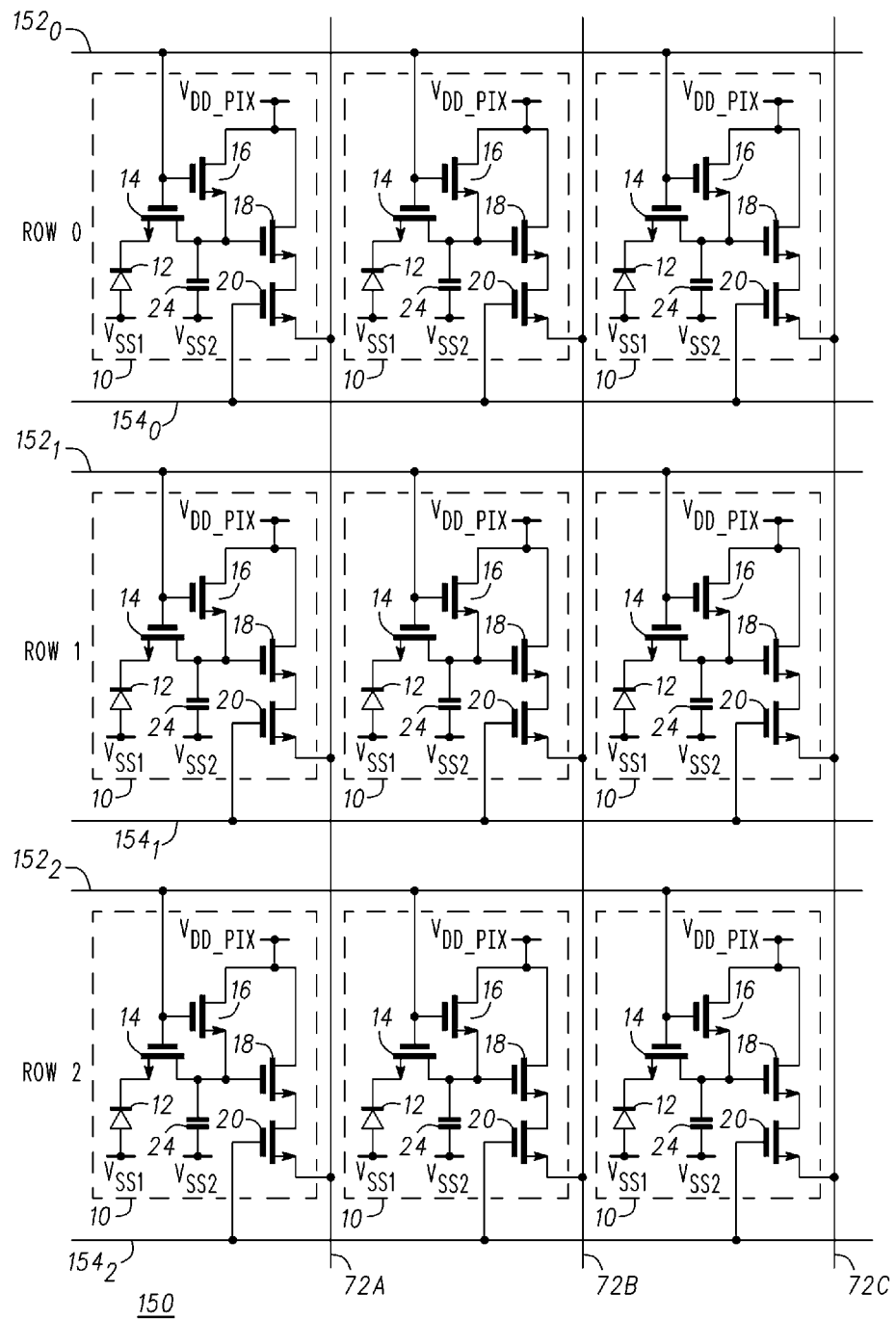
FIG. 7 is a portion of an array of the pixels of FIG. 2 in accordance with an embodiment of the present invention.

FIG. 7 is a circuit schematic of an active pixel array in accordance with an embodiment of the present invention. What is shown in FIG. 7 is a 3×3 section 150 of a sensor array of active pixels 10. It should be noted that a typical pixel array may have more than a million pixels arranged in rows and columns. In accordance with an embodiment, each pixel is connected to a transfer/reset bus, a select bus, and corresponding columns 74A, 74B, and 74C. More particularly, for each pixel row the commonly connected transfer transistor and reset transistor gate terminals (node 15 in FIG. 1) are connected to the transfer/reset bus and the select transistor gate terminals (terminal 21 in FIG. 1) are connected to the select bus. Thus, nodes 15 of row 0 are connected to transfer/reset bus 152$_0$ and gates terminals 21 of row 0 are connected to select bus 154$_0$; nodes 15 of row 1 are connected to transfer/reset bus 152$_1$ and gates terminals 21 of row 0 are connected to select bus 154$_1$; and nodes 15 of row 2 are connected to transfer/reset bus 152$_2$ and gates terminals 21 of row 2 are connected to select bus 154$_2$. Voltage $V_{TRRE}$ is applied to transfer/reset busses 152$_0$, 152$_1$, and 152$_2$, and voltage $V_{SEL}$ is applied to select busses 154$_0$, 154$_1$, and 154$_2$. The source terminals of each select transistor in a column of pixels is connected to a corresponding column 74A, 74B, and 74C. Each column may be coupled to a precharge transistor (not shown) for operation in current starvation mode in which the columns are precharged before sampling and where the sampling occurs without an active current load. Alternatively, each column may be coupled for receiving a bias current from a voltage controlled current sink.

An array of pixels comprising a plurality of image sensors 10 can operate in a rolling shutter operating mode or a snapshot operating mode. In both the rolling shutter and the snapshot operating modes, photodiodes 12 and floating diffusion capacitors 24 are reset before integration. In the rolling shutter operating mode, photodiodes 12 and floating diffusion capacitors 24 in a first row, e.g., row 0, are reset by applying a voltage $V_{TRRE}$ to transfer/reset bus 152$_0$ and thus to nodes 15, i.e., the common gates of transfer transistors 14 and reset transistors 16. After row 0 is reset each subsequent row is reset in sequence, for example, row 1, row 2, etc. The sequence for resetting the rows of pixels is not a limitation of the present invention. For example, resetting can first occur on a row other than row 0 and may occur out of sequence, i.e., row 2 may be reset after row 0 or row 0 may be reset after row 1. Resetting the rows discharges photodiodes 12 and floating diffusion capacitors 24.

Figure 8:
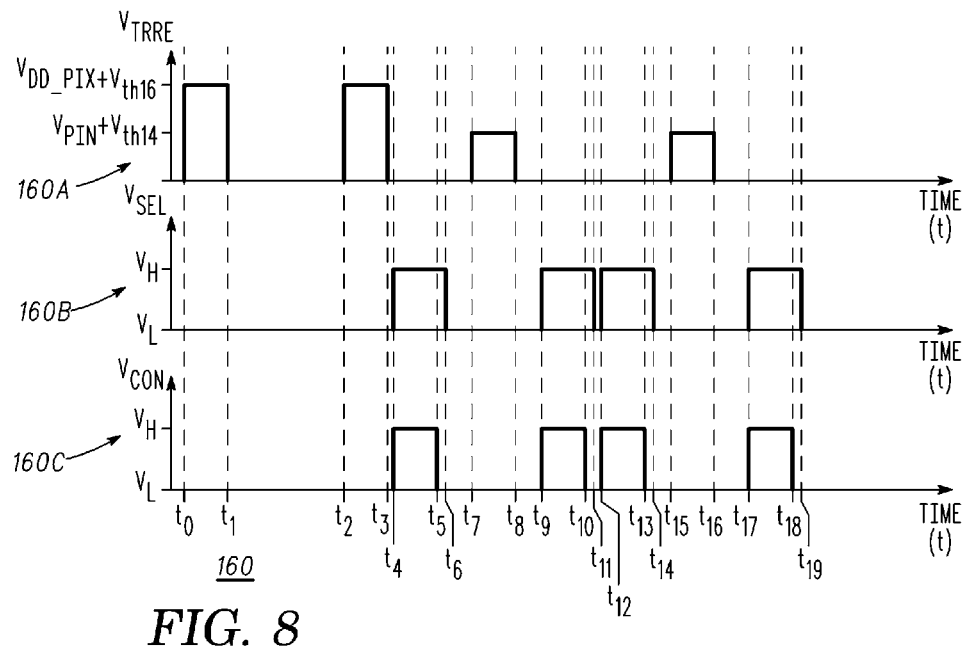
FIG. 8 is a timing diagram of operation of the pixel of FIG. 2 in a rolling shutter mode of operation.

FIG. 8 is a timing diagram 160 for operation in the rolling shutter operating mode in accordance with an embodiment of the present invention. Timing diagram 160 includes plots 160A, 160B, and 160C. The photodiodes 12 and floating diffusion capacitors 24 of row 0 are reset or discharged by raising voltage $V_{TRRE}$ of transfer/reset bus 152$_0$ to a voltage that is greater than or equal to voltage $V_{DD\_PIX}+V_{th16}$ at time $t_0$. At time $t_1$, photodiodes 12 and floating diffusion capacitors 24 are sufficiently discharged, thus voltage $V_{TRRE}$ transitions to about zero volts. Photodiodes 12 and floating diffusion capacitors 24 of row 1 are reset or discharged by raising voltage $V_{TRRE}$ of transfer/reset bus 152$_1$ to a voltage that is greater than or equal to voltage $V_{DD\_PIX}+V_{th16}$ at time $t_2$. At time $t_3$, photodiodes 12 and floating diffusion capacitors 24 are sufficiently discharged, thus voltage $V_{TRRE}$ transitions to about zero volts. This process continues for each subsequent row until each of the rows of photodiodes 12 and floating diffusion capacitors 24 have been reset. Although only three rows and three columns are shown in FIG. 7 and only resetting of row 0 and row 1 have been shown in plot 160A, it should be understood that the number of rows and columns is not a limitation of the present invention and that preferably each row of photodiodes 12 and floating diffusion capacitors 24 are reset.

At time $t_4$, select voltage $V_{SEL}$ is applied to row selector bus 154$_0$ and column 74A is asserted to read the floating diffusion voltage at node 22, i.e., select voltage $V_{SEL}$ and control voltage $V_{CON}$ transition to logic high voltage levels $V_H$. After reading out the floating diffusion voltage, control voltage $V_{CON0}$ transitions to a logic low voltage $V_L$ at time $t_5$ and select voltage $V_{SEL}$ transitions to a logic low voltage $V_L$ at time $t_6$. Alternatively, select voltage VSEL may be maintained at a logic high voltage level from about time $t_6$ to about time $t_9$.

At time $t_7$, voltage $V_{TRRE}$ transitions to a voltage that is greater than or equal to voltage $V_{PIN}+V_{th14}$. More particularly, voltage $V_{TRRE}$ transitions to a voltage that is greater than or equal to voltage $V_{PIN}+V_{th14}$ and less than voltage $V_{DD\_PIX}+V_{th16}$ thereby transferring the charge from photodiodes 12 associated with row 0 to floating diffusion capacitors 24 associated with row 0. At time $t_8$, voltage $V_{TRRE}$ transitions to about zero volts. Maintaining voltage $V_{TRRE}$ at a level that is greater than or equal to voltage $V_{PIN}+V_{th14}$ and less than voltage $V_{DD\_PIX}+V_{th16}$ provides a voltage that is sufficient to transfer the charge from the photodiode, but is insufficient to reset photodiodes 12 and floating diffusion capacitors 24 because pinned photodiodes 12 reset to their depletion or pinning voltage $V_{PIN}$.

At time $t_9$, select voltage $V_{SEL}$ is applied to row selector bus 154$_0$ and control voltage $V_{CON4}$ asserts column 74A so that the floating diffusion voltage at node 22 can be read, i.e., select voltage $V_{SEL}$ and control voltage $V_{CON4}$ transition to logic high voltage levels $V_H$. After reading out the floating diffusion voltage, control voltage $V_{CON4}$ transitions to a logic low voltage $V_L$ at time $t_{10}$ and select voltage $V_{SEL}$ transitions to a logic low voltage $V_L$ at time $t_{11}$. Subtraction circuitry (not shown) subtracts the voltage read out during the time period from time $t_4$ to time $t_5$ and the voltage read at time $t_9$ to remove ktc noise and fixed pattern noise.

At time $t_{12}$, select voltage $V_{SEL}$ is applied to row selector bus $154_1$ and a control voltage $V_{CON1}$ column 74B so that the floating diffusion voltage at node 22 can be read, i.e., select voltage $V_{SEL}$ and control voltage $V_{CON1}$ transition to logic high voltage levels $V_H$. After reading out the floating diffusion voltage, control voltage $V_{CON1}$ transitions to a logic low voltage $V_L$ at time $t_{13}$ and select voltage $V_{SEL}$ transitions to a logic low voltage $V_L$ at time $t_{14}$.

At time $t_{15}$, voltage $V_{TRRE}$ transitions to a voltage that is greater than or equal to voltage $V_{PIN}+V_{th14}$. More particularly, voltage $V_{TRRE}$ transitions to a voltage that is greater than or equal to voltage $V_{PIN}+V_{th14}$ and less than voltage $V_{DD\_PIX}+V_{th16}$ thereby transferring the charge from photodiode 12 associated with row 1 to floating diffusion capacitor 24 associated with row 1. At time $t_{16}$, voltage $V_{TRRE}$ transitions to about zero volts. Maintaining voltage $V_{TRRE}$ at a level that is greater than or equal to voltage $V_{PIN}+V_{th14}$ and less than voltage $V_{DD\_PIX}+V_{th16}$ provides a voltage that is sufficient to transfer the charge from the photodiode, but is insufficient to reset photodiodes 12 and floating diffusion capacitors 24 because pinned photodiodes 12 reset to their depletion or pinning voltage $V_{PIN}$.

At time $t_{17}$, select voltage $V_{SEL}$ is applied to row selector bus $154_1$ and a control voltage $V_{CON1}$ asserts column 1 so that the floating diffusion voltage at node 22 can be read, i.e., select voltage $V_{SEL}$ and control voltage $V_{CON1}$ transition to logic high voltage levels $V_H$. After reading out the floating diffusion voltage, control voltage $V_{CON1}$ transitions to a logic low voltage $V_L$ at time $t_{18}$ and select voltage $V_{SEL}$ transitions to a logic low voltage $V_L$ at time $t_{19}$. Subtraction circuitry (not shown) subtracts the voltage read out during the time period from time $t_4$ to time $t_5$ and the voltage read at time $t_{17}$ to remove ktc noise and fixed pattern noise.

It should be noted that the pulse $V_{TRRE}$ between times $t_0$ and $t_1$ correspond to resetting row 0 and the pulse between times $t_2$ and $t_3$ correspond to resetting row 1. The pulses between times $t_4$ and $t_{10}$ correspond to selecting and transferring data from row 0 and the pulses between times $t_{12}$ and $t_{19}$ correspond to selecting and transferring data from row 1. This process continues for each row in the pixel array. Preferably, the time period between times $t_1$ and $t_8$ is the same as the time for the time period between times $t_3$ and $t_{16}$. These time periods represent the integration time for the corresponding TOWS.

In the snapshot mode of operation, after the integration time the charge from photodiodes 12 is transferred to the floating diffusion capacitors 24 for all the pixels at the same time. Then the signal level from row 0 is read followed by resetting floating diffusion capacitors 24 and reading the reset level. This readout is performed on a row by row basis until all the rows have been read.

Figure 9:
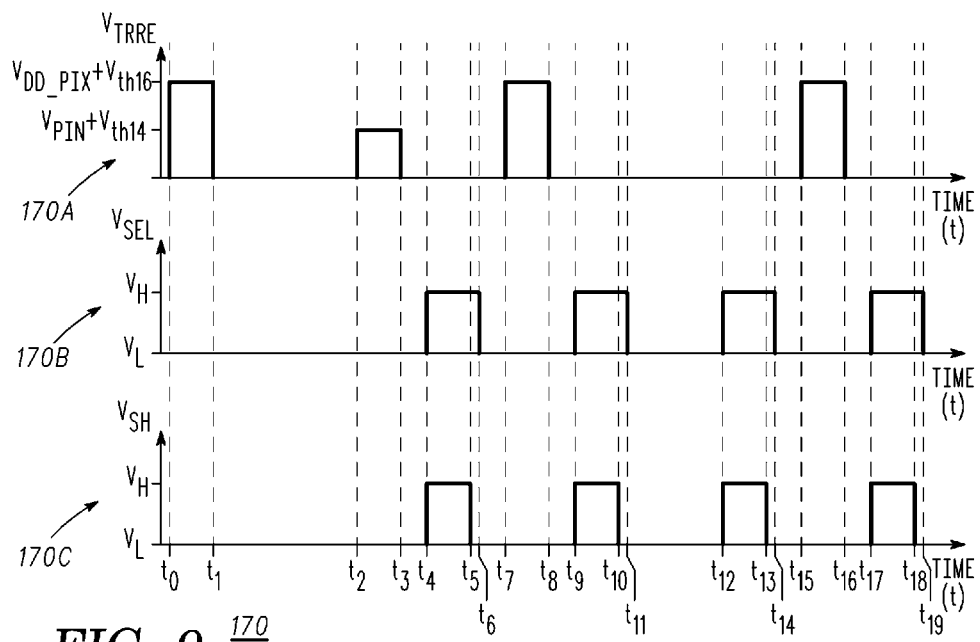
FIG. 9 is a timing diagram of operation of the pixel of FIG. 2 in a snapshot mode of operation.

FIG. 9 is a timing diagram 170 for operation in the snapshot mode in accordance with an embodiment of the present invention. Timing diagram 170 includes plots 170A, 170B, and 170C. Photodiodes 12 and floating diffusion capacitors 24 for all the pixels are reset or discharged by raising voltage $V_{TRRE}$ to a voltage that is greater than or equal to voltage $V_{DD\_PIX}+V_{th16}$ at time $t_0$. At time $t_1$, photodiodes 12 and floating diffusion capacitors 24 are sufficiently discharged, thus voltage $V_{TRRE}$ transitions to about a zero volt level.

At time $t_2$, voltage $V_{TRRE}$ transitions to a voltage that is greater than or equal to voltage $V_{PIN}+V_{th14}$. More particularly, voltage $V_{TRRE}$ transitions to a voltage that is greater than or equal to voltage $V_{PIN}+V_{th14}$ and less than voltage $V_{DD\_PIN}+V_{th16}$ thereby globally transferring the charge from photodiodes 12 to floating diffusion capacitors 24. At time $t_3$, voltage $V_{TRRE}$ transitions to about zero volts.

At time $t_4$, select voltage $V_{SEL}$ is applied to row selector bus $154_0$ and a control voltage $V_{CON0}$ column 74A so that the floating diffusion voltage at node 22 can be read, i.e., select voltage $V_{SEL}$ and control voltage $V_{CON0}$ transition to logic high voltage levels $V_H$. After reading out the floating diffusion voltage, control voltage $V_{CON0}$ transitions to a logic low voltage $V_L$ at time $t_5$ and select voltage $V_{SEL}$ transitions to a logic low voltage $V_L$ at time $t_6$.

At time $t_7$, voltage $V_{TRRE}$ transitions to a voltage that is greater than or equal to voltage $V_{DD\_PIX}+V_{th16}$, which resets photodiodes 12 and floating diffusion capacitors 24. At time $t_8$, photodiodes 12 and floating diffusion capacitors 24 are sufficiently discharged, thus voltage $V_{TRRE}$ transitions to about zero volts.

At time $t_9$, select voltage $V_{SEL}$ is applied to row selector bus $154_0$ and a control voltage $V_{CON0}$ asserts column 74A so that the floating diffusion voltage at node 22 can be read, i.e., select voltage $V_{SEL}$ and control voltage $V_{CON0}$ transition to logic high voltage levels $V_H$. After reading out the floating diffusion voltage, control voltage $V_{CON0}$ transitions to a logic low voltage $V_L$ at time $t_{10}$ and select voltage $V_{SEL}$ transitions to a logic low voltage $V_L$ at time $t_{11}$.

At time $t_{12}$, select voltage $V_{SEL}$ is applied to row selector bus $154_1$ and a control voltage $V_{CON1}$ asserts column 74B so that the floating diffusion voltage at node 22 can be read, i.e., select voltage $V_{SEL}$ and current source control voltage $V_{CON1}$ transition to logic high voltage levels $V_H$. Control voltage $V_{CON1}$ transitions to a logic low voltage $V_L$ at time $t_{13}$ and select voltage $V_{SEL}$ transitions to a logic low voltage $V_L$ at time $t_{14}$.

At time $t_{15}$, voltage $V_{TRRE}$ transitions to a voltage that is greater than or equal to voltage $V_{DD\_PIX}+V_{th16}$, which resets photodiodes 12 and floating diffusion capacitors 24. At time $t_{15}$, voltage $V_{TRRE}$ transitions to about zero volts.

At time $t_{17}$, select voltage $V_{SEL}$ is applied to row selector bus $154_1$ and a control voltage $V_{CON1}$ asserts column 74B so that the floating diffusion voltage at node 22 can be read, i.e., select voltage $V_{SEL}$ and current source control voltage $V_{CON1}$ transition to logic high voltage levels $V_H$. After reading out the floating diffusion voltage, current source control voltage $V_{CON1}$ transitions to a logic low voltage $V_L$ at time $t_{18}$ and select voltage $V_{SEL}$ transitions to a logic low voltage $V_L$ at time $t_{19}$. This process continues so that each row of pixels can be read.

Resetting the pixels discharges the voltages across photodiodes 12 and floating diffusion capacitors 24. These voltages are reset in a first row, e.g., row 0, by applying a $V_{TRRE}$ to the transfer/reset busses and thus to the nodes 15, i.e., the common gates of transfer transistors 14 and reset transistors 16. Voltage $V_{TRRE}$ is a function of the threshold voltages of transfer transistors 14 and reset transistors 15 and the depletion voltage $V_{PIN}$ of photodiodes 12. By way of example, floating diffusion capacitor 24 can be reset by setting voltage $V_{TRRE}$ in accordance with EQT. 1:

$$V_{TRRE} \geq V_{DD\_PIX}+V_{th16} \qquad \text{EQT. 1}$$

where, $V_{DD\_PIX}$ is the voltage at the drain reset transistor 16; and
$V_{th16}$ is the threshold voltage of reset transistor 16.

Resetting floating diffusion capacitor 24 may be referred to as a hard reset of the floating diffusion. It should be noted that the voltage for a hard reset is a function of the body effect because the source of transistor 16 is connected to a voltage level other than ground.

Photodiode 12 can be reset by setting voltage $V_{TRRE}$ in accordance with EQT. 2:

$$V_{TRRE} \geq V_{PIN} + V_{th14} \quad \text{EQT. 2}$$

where, $V_{PIN}$ is the depletion voltage at transfer transistor 14; and
$V_{th14}$ is the threshold voltage of reset transistor 14.

Thus, photodiodes 12 and floating diffusion capacitors 24 can be reset by applying a voltage greater than or equal to the sum of the voltage $V_{DD\_PIX}$ at the drain of reset transistor 16 and the product of the threshold voltage of reset transistor and 1.5, i.e., $V_{DD\_PIX} + V_{th16}$.

In response to stimulus by light and after the integration time, a voltage is applied to nodes 15, i.e., the common gates of transistors 14 and 16, via the transfer/reset bus, which is high enough so that charge is transferred from photodiodes 12 to floating diffusion capacitors 24, but low enough to maintain reset transistor 16 in the cut-off operating mode. Thus, charge transfer occurs without resetting floating diffusion capacitors 24. To maintain reset transistor 16 in the cut-off operating mode during charge transfer, the gate-to-source voltage of reset transistor 16 ($v_{gs16}$) is set below the threshold voltage $v_{th16}$ of reset transistor 16. The gate-to-source voltage of reset transistor 16 ($v_{gs16}$) can be maintained during the transfer pulse at a voltage less than the threshold voltage of transistor 16 ($v_{th16}$) by setting the upper voltage $V_{15UP}$ at node 15 in accordance with EQT. 3:

$$V_{15UP} \leq (V_{DD\_PIX} - \Delta V_{16}) + v_{th16} \quad \text{EQT. 3}$$

where:

$V_{DD\_PIX}$ is the voltage at the drain reset transistor 16;
$\Delta V_{16}$ is a crosstalk voltage from node 15 to node 22; and
$v_{th16}$ is the threshold voltage of reset transistor 16.

To transfer the charge from photodiodes 12 in light and dark conditions, the lower voltage $V_{15LO}$ at node 15 may be set in accordance with EQT. 4;

$$V_{15LO} \geq V_{PIN} + V_{th14} \quad \text{EQT. 4}$$

where, $V_{PIN}$ is the depletion voltage of photodiode 12; and
$V_{th14}$ is the threshold voltage of transfer transistor 14.

Thus, in response to the voltage at node 15 being less than or equal to $(V_{DD\_PIX} - \Delta V_{16}) + V_{th16}$ and greater than or equal to $V_{PIN} + V_{th14}$, charge will be transferred from photodiodes 12 to floating diffusion capacitors 24 in the dark, without a reset.

For charge transfer that occurs when photodiodes 12 are saturated, the gate-to-source voltage, $v_{gs16}$, of reset transistor 16 is maintained below the threshold voltage $v_{th16}$ of reset transistor 16 as described with reference to EQT. 3 above. The floating diffusion voltage decreases in accordance with the amount of charge being transferred from photodiodes 12 to floating diffusion capacitors 24. To leave the floating diffusion voltage undisturbed or to not reset the floating diffusion capacitors 24 while transferring a large amount of charge, upper voltage $V_{15up}$ is given by EQT. 5:

$$V_{15up} \leq (V_{DD\_PIX} - \Delta V_{16} - \Delta V_{TR}) + v_{th16} \quad \text{EQT. 5}$$

where:

$V_{DD\_PIX}$ is the voltage at the drain reset transistor 16;
$\Delta V_{16}$ is a crosstalk voltage from node 15 to node 22;
$\Delta V_{TR}$ is change in voltage in response to the charge transfer; and
$v_{th16}$ is the threshold voltage of reset transistor 16.

Figure 10:
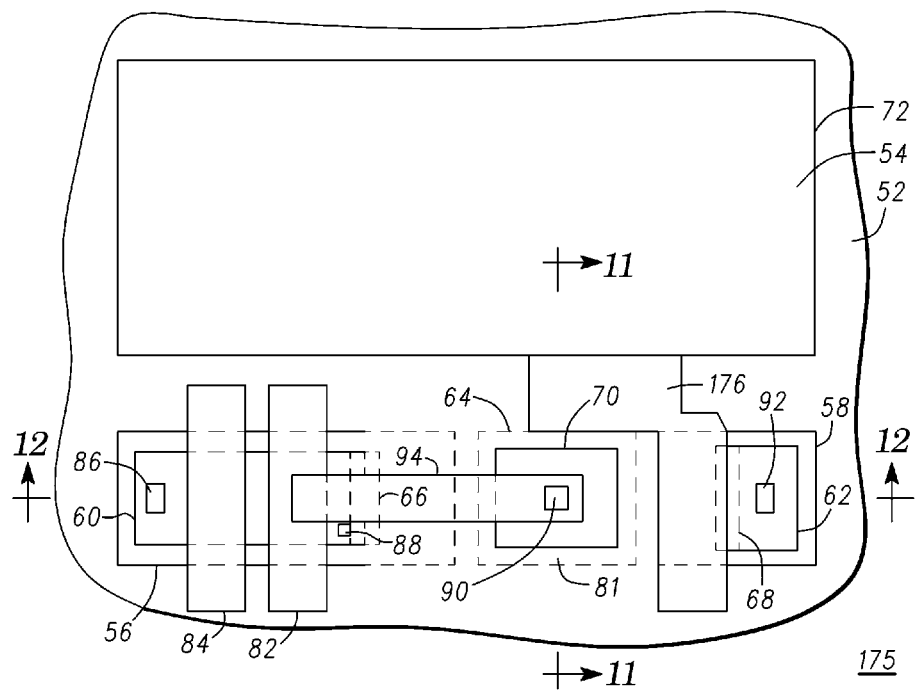
FIG. 10 a top view of the pixel of FIG. 2 during manufacture in accordance with another embodiment of the present invention.

FIG. 10 is a top view of pixel 175 during manufacture. What is shown in FIG. 10 are gate structures 82, 84, 175, contacts 86, 88, 90, 92, and an interconnect 94. It should be noted that interconnect 94 couples doped region 64 with gate structure 82. It should be further noted that a gate structure is comprised of a gate electrode and a gate dielectric material. The gate electrode and gate dielectric materials are illustrated in the drawings and collectively referred to as a gate structure. The gate structure is referred to as a gate in the figures containing circuit schematics. With reference to FIGS. 2 and 10, gate structure 175 serves as a common gate structure for transfer transistor 14 and reset transistor 16, gate structure 82 serves as the gate structure for source follower transistor 18, and gate structure 84 serves as the gate structure for select transistor 20. Gate structure 175 is an L-shaped structure.

Figure 11:
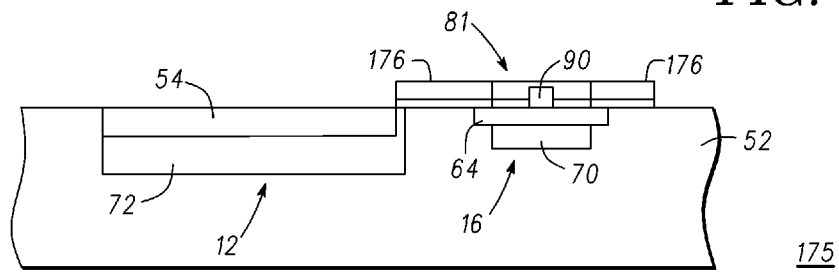
FIG. 11 is a cross-sectional view of taken along section line 11-11 of FIG. 10 in accordance with an embodiment of the present invention.

FIG. 11 is a cross-sectional view of pixel 175 taken along section line 11-11 of FIG. 10. FIG. 11 illustrates a cross-sectional view of photodiode 12, transfer transistor 14, and common gate structure 175. For the sake of clarity interconnect 94 has been omitted from FIG. 11. Photodiode 12 is laterally adjacent transfer transistor 14 and floating diffusion capacitor 24. A floating diffusion region 70 serves as a portion of floating diffusion capacitor 24. A contact 90 is formed in contact with source region 64 of reset transistor 16 and a contact 92 is formed in contact with drain region 62 of select transistor 16.

Figure 12:
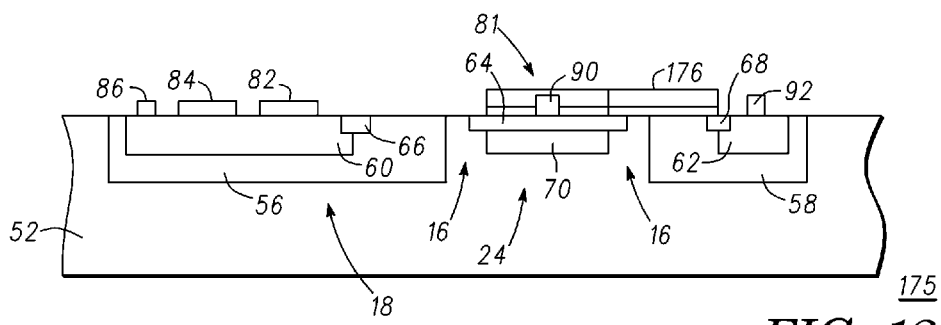
FIG. 12 is a cross-sectional view of the pixel of FIG. 10 taken along section line 12-12 of FIG. 10 in accordance with an embodiment of the present invention.

FIG. 12 is a cross-sectional view of pixel 10 taken along section line 12-12 of FIG. 10. FIG. 12 illustrates transfer transistor 14 and reset transistor 16 having a common gate structure 175, source follower transistor 18 having gate structure 82 and select transistor 20 having gate structure 84. Floating diffusion region 70, which serves as a portion of floating diffusion capacitor 24, is laterally adjacent reset transistor 16. A contact 90 is formed in contact with source region 64 of reset transistor 16, a contact 92 is formed in contact with drain region 62 of select transistor 16, and a contact 86 is formed in contact with the drain region of select transistor 20. For the sake of clarity interconnect 94 has been omitted from FIG. 11.

Figure 13:
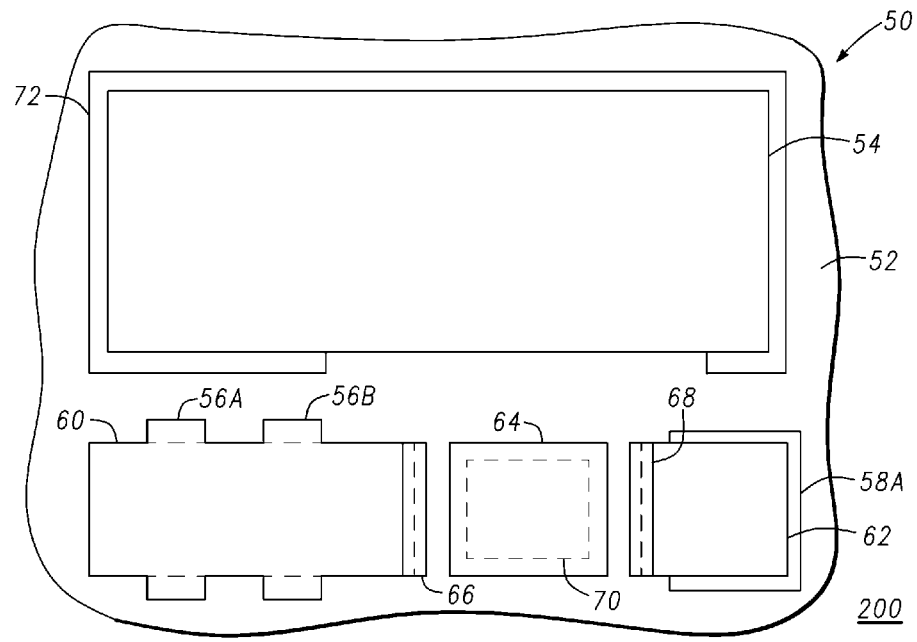
FIG. 13 is a top view of the pixel of FIG. 2 during manufacture in accordance with an embodiment of the present invention.

FIG. 13 is a top view of a pixel 200 during manufacture in accordance with an embodiment of the present invention. What is shown in FIG. 13 is a portion of a semiconductor chip 50 comprising a semiconductor material 52 which can be of P-type conductivity or N-type conductivity. A photodiode region 54 and doped regions 56A, 56B, and 58A are formed in portions of semiconductor material 52. Doped regions 60 and 62 are formed in portions of semiconductor material 52 and a doped region 64 is formed between and laterally spaced apart from doped regions 56 and 58. A doped region 66 is formed in a portion of semiconductor material 52 and a doped region 68 is formed in a portion of semiconductor material 52 and doped region 62. A doped region 70 extends from doped region 64 into semiconductor material 52. By way of example, doped regions 60, 62, 64, 66, 68, and 70 are of opposite conductivity type to doped regions 56A and 58A. More particularly, semiconductor material 52 may be an epitaxial layer of P-type conductivity formed over a semiconductor substrate of P-type conductivity, doped regions 56A and 58A may be regions doped with an impurity material of P-type conductivity, and doped regions 60, 62, 64, 66, 68, and 70 may be regions doped with an impurity material of N-type conductivity. Doped regions 64, 66, and 68 are typically lightly doped drain regions and doped region 70 is a floating diffusion region.

Figure 14:
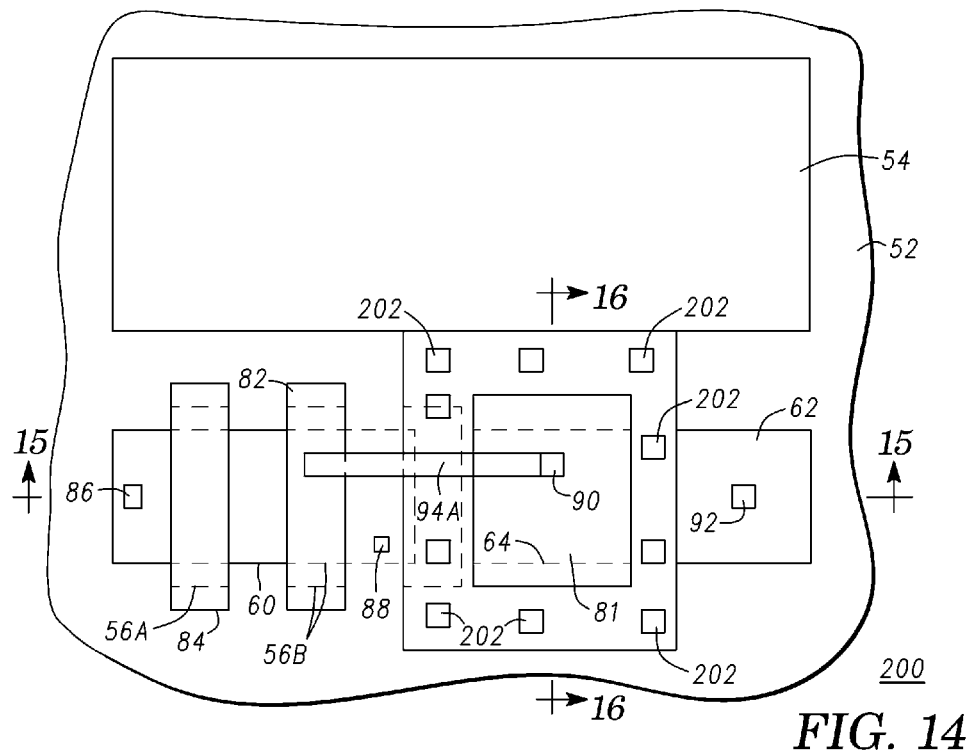
FIG. 14 is a top view of the pixel of FIG. 13 during manufacture in accordance with an embodiment of the present invention.

FIG. 14 is a top view of pixel 200 of FIG. 10 during manufacture. What is shown in FIG. 14 are gate structures 80, 82, 84, contacts 86, 88, 90, 92, and an interconnect 94 coupling doped region 64 with gate structure 82. With reference to FIGS. 2 and 14, gate structure 80 serves as a common gate structure for transfer transistor 14 and reset transistor 16, gate structure 82 serves as the gate structure for source follower transistor 18, and gate structure 84 serves as the gate structure for select transistor 20. A plurality of contacts 202 are formed on common gate structure 80, which block light coming from the sides of contacts 202. Contacts 202 may be referred to as light shielding elements. It should be noted that photons coming from the sides of contacts 202 (between a metal 1 layer and polysilicon) can get into the region of floating diffusion capacitor 24. Thus, contacts 202 help block light from entering the region of floating diffusion capacitors 24.

Figure 15:
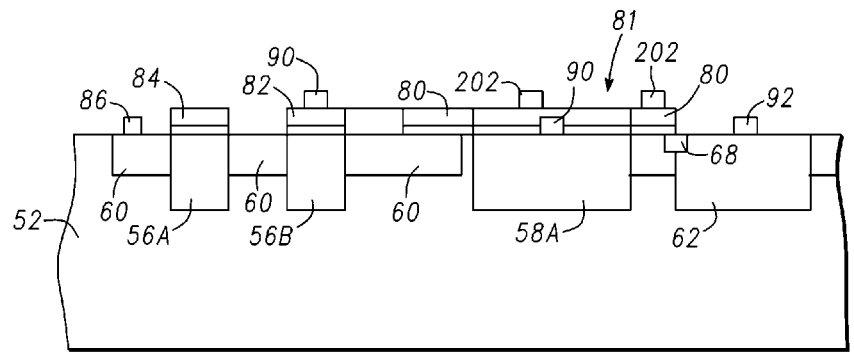
FIG. 15 is a cross-sectional view of the pixel of FIG. 14 taken along section line 15-15 of FIG. 14 in accordance with an embodiment of the present invention.

FIG. 15 is a cross-sectional view of pixel 200 taken along section line 15-15 of FIG. 14. FIG. 15 illustrates transfer transistor 14 and reset transistor 16 having a common gate structure 80. For the sake of clarity interconnect 94 has been omitted from FIG. 15. A floating diffusion region 70, which serves as a portion of floating diffusion capacitor 24, is adjacent one side of transfer transistor 14 and a photodiode 12 is adjacent an opposite side of transfer transistor 14. A contact 90 is formed in contact with source region 64 of reset transistor 16 and a contact 92 is formed in contact with drain region 62 of select transistor 16.

Figure 16:
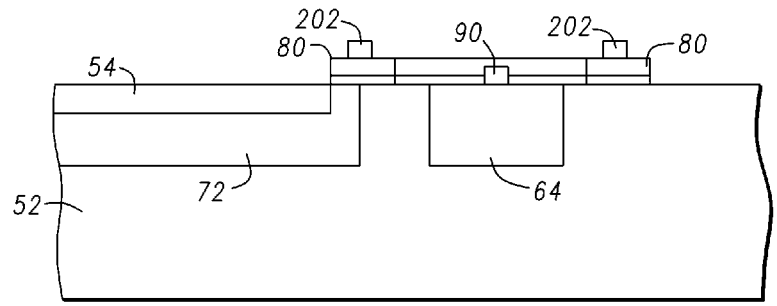
FIG. 16 is a cross-sectional view of the pixel of FIG. 14 taken along section line 16-16 of FIG. 14 in accordance with an embodiment of the present invention.

FIG. 16 is a cross-sectional view of pixel 200 taken along section line 16-16 of FIG. 14. FIG. 16 illustrates transfer transistor 14 and reset transistor 16 having a common gate structure 80, source follower transistor 18 having gate structure 82, and select transistor 20 having gate structure 84. A floating diffusion region 70, which serves as a portion of floating diffusion capacitor 24, is adjacent transfer transistor 14. A contact 90 is formed in contact with source region 64 of reset transistor 16, a contact 92 is formed in contact with drain region 62 of select transistor 16, and a contact 86 is formed in contact with the drain region of select transistor 20. For the sake of clarity interconnect 94 has been omitted from FIG. 16.

Figure 17:
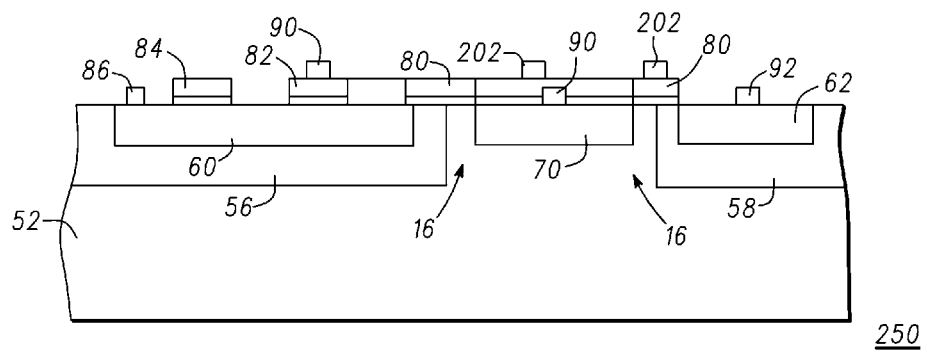
FIG. 17 is a cross-sectional view of a pixel in accordance with another embodiment of the present invention.

FIG. 17 is a cross-sectional view of a pixel 250 that is similar to pixel 10 shown in FIG. 5, except that that lightly doped regions 64, 66, and 68 are absent. Thus, FIG. 17 illustrates transfer transistor 14 and reset transistor 16 having a common gate structure 80 and a floating diffusion region 70, which serves as a portion of floating diffusion capacitor 24, which is adjacent one side of transfer transistor 14. A contact 90 is formed in contact with floating diffusion region 70 and a contact 92 is formed in contact with drain region 62 of select transistor 16.

Figure 18:
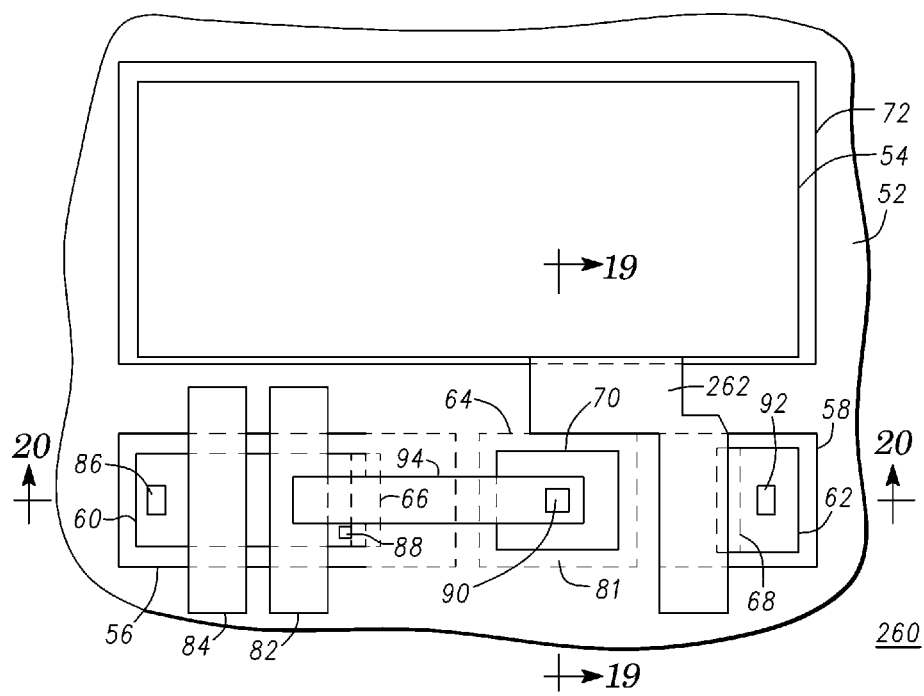
FIG. 18 is a top view of a pixel during manufacture in accordance with another embodiment of the present invention.

FIG. 18 is a top of a pixel 260 in accordance with another embodiment of the present invention. Portions of pixel 260 such as, for example, doped regions 54, 56, 58, 60, 62, 64, 66, 68, 70, and 72 have been described with reference to FIG. 3. What is shown in FIG. 15 are gate structures 82, 84, and 262 contacts 86, 88, 90, 92, and 264, and an interconnect 94. It should be noted that interconnect 94 couples doped region 64 with gate structure 82. It should be further noted that a gate structure is comprised of a gate electrode and a gate dielectric material. The gate electrode and gate dielectric materials are illustrated in the drawings and collectively referred to as a gate structure. The gate structure is referred to as a gate in the figures containing circuit schematics. With reference to FIGS. 2 and 15, gate structure 262 serves as a common gate structure for transfer transistor 14 and reset transistor 16, gate structure 82 serves as the gate structure for source follower transistor 18, and gate structure 84 serves as the gate structure for select transistor 20.

Figure 19:
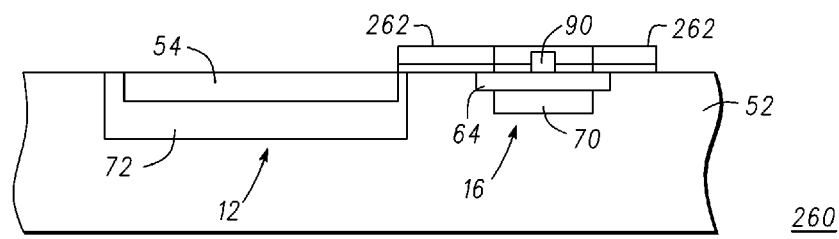
FIG. 19 is a cross-sectional view of the pixel of FIG. 18 taken along section line 19-19 of FIG. 18 in accordance with another embodiment of the present invention.

FIG. 19 is a cross-sectional view of pixel 260 taken along section line 19-19 of FIG. 18. FIG. 19 illustrates a cross-sectional view of photodiode 12, transfer transistor 14, and common gate structure 262. For the sake of clarity interconnect 94 has been omitted from FIG. 19. Photodiode 12 is laterally adjacent transfer transistor 14 and floating diffusion capacitor 24. A floating diffusion region 70, which serves as a portion of floating diffusion capacitor 24, is below a portion of a portion of source region 64. A contact 90 is formed in contact with source region 64 of reset transistor 16 and a contact 92 is formed in contact with drain region 62 of select transistor 16.

Figure 20:
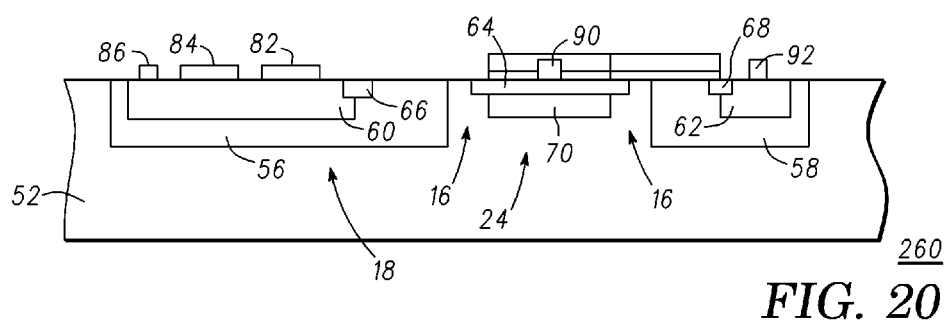
FIG. 20 is a cross-sectional view of the pixel of FIG. 18 taken along section line 20-20 of FIG. 18 in accordance with an embodiment of the present invention.

FIG. 20 is a cross-sectional view of pixel 260 taken along section line 22-22 of FIG. 18. FIG. 18 illustrates transfer transistor 14 and reset transistor 16 having a common gate structure 262, source follower transistor 18 having gate structure 82 and select transistor 20 having gate structure 84. Floating diffusion region 70, which serves as a portion of floating diffusion capacitor 24, is laterally adjacent reset transistor 16. A contact 90 is formed in contact with source region 64 of reset transistor 16, a contact 92 is formed in contact with drain region 62 of select transistor 16, and a contact 86 is formed in contact with the drain region of select transistor 20. For the sake of clarity interconnect 94 has been omitted from FIG. 20.

Figure 21:
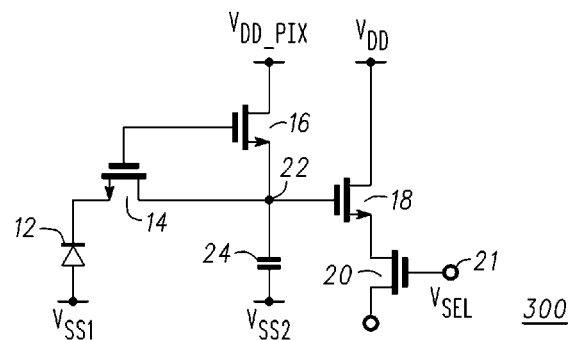
FIG. 21 is a circuit schematic of a pixel in accordance with another embodiment of the present invention.

FIG. 21 is a circuit schematic of a pixel 300 in accordance with another embodiment of the present invention. Pixel 300 is similar to pixel 10 except that the drain of reset transistor 16 is not directly connected to the drain of source follower transistor 18. Thus, pixel 300 is comprised of photodiode 12, transfer transistor 14, reset transistor 16, source follower transistor 18, and select transistor 20. By way of example, photodiode 12 is a pinned photodiode having an anode and a cathode and transistors 14-20 are Metal Oxide Field Effect Transistors (MOSFETs), where each transistor has a gate, a drain, and a source. More particularly, the gate of transfer transistor 14 is connected to the gate of reset transistor 16 and the drain of transfer transistor 14 is commonly connected to the source of reset transistor 16 and to the gate of source follower transistor 18 to form a node 22. The source of transfer transistor 14 is connected to the cathode of photodiode 12 and the anode of photodiode 12 is coupled for receiving a source of operating potential $V_{SS}$. By way of example source of operating potential $V_{SS}$ is ground. Node 22 is connected to source of operating potential $V_{SS}$ through floating diffusion capacitor 24. Node 22 may be referred to as a floating diffusion node. The drain of reset transistor 16 is connected to pixel voltage $V_{DD\_PIX}$ and the drain of source follower transistor 18 is coupled for receiving a pulsed source of operating potential $V_{DD}$. Separating the sources of operating potential coupled to the drains of transfer transistor 16 and source follower transistor 18 allows for a higher signal swing at floating diffusion node 22 caused by clock feedthrough through the parasitic drain-gate capacitance of transistor 18. This allows the use of a higher transfer voltage and a higher pinning voltage VPIN of photodiode 12. Thus, a larger amount of charge can be stored and transferred from photodiodes 12 to floating diffusion capacitors 24. The source of source follower 18 is connected to the drain of select transistor 20. The gate of select transistor 20 is coupled for receiving a select signal $V_{SEL}$. Because the gates of transfer transistor 14 and reset transistor 16 are commonly connected, the configuration may be referred to as a common gate pixel or a common gate 4T pixel.

Figure 22:
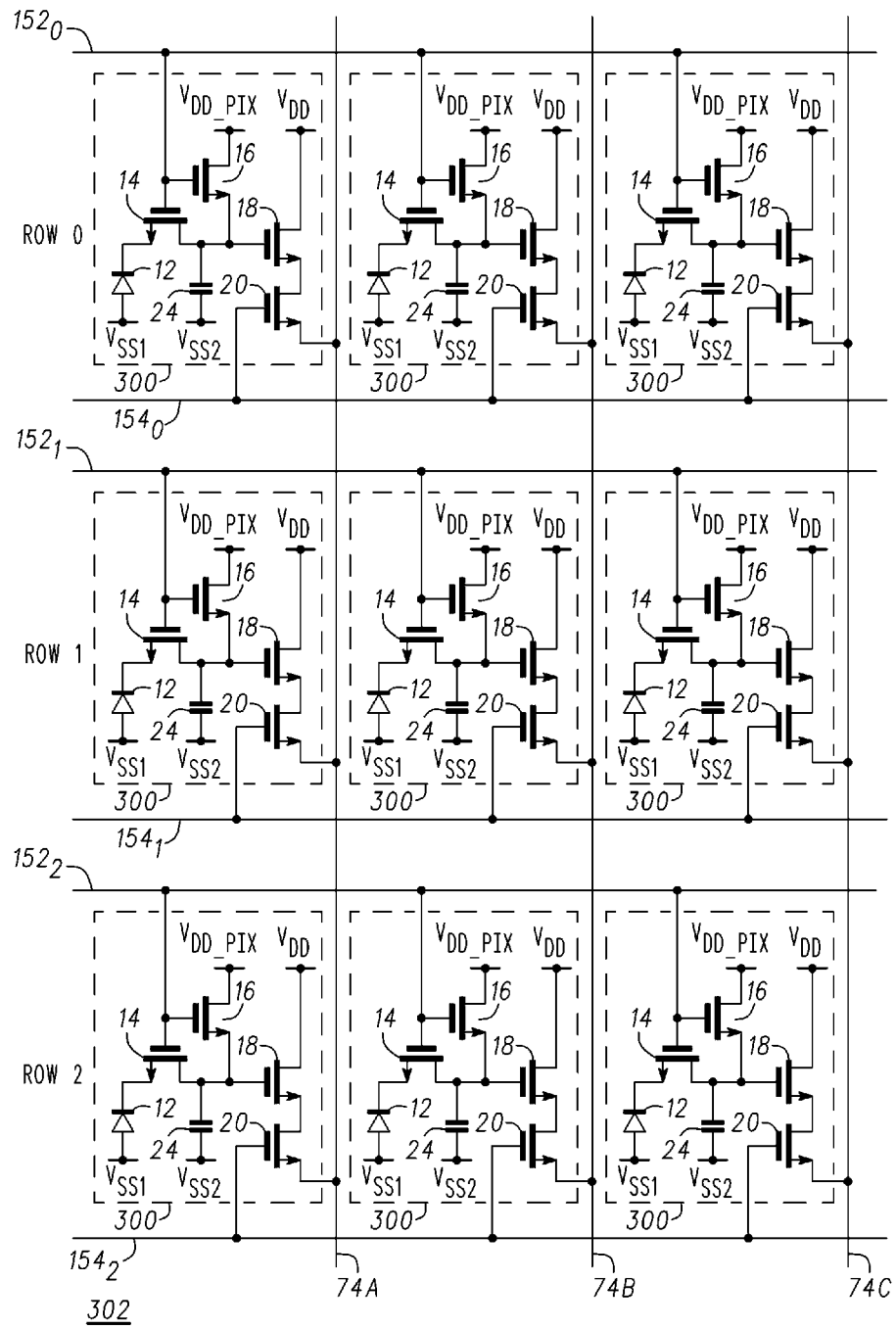
FIG. 22 is a portion of an array of the pixels of FIG. 21 in accordance with an embodiment of the present invention.

FIG. 22 is a circuit schematic of an active pixel array in accordance with an embodiment of the present invention. What is shown in FIG. 22 is a 3×3 section 302 of a sensor array of active pixels 300. It should be noted that a typical pixel array may have more than a million pixels arranged in rows and columns. In accordance with an embodiment, each pixel is connected to a transfer/reset bus, a select bus, and a corresponding column 74A, 74B, and 74C. More particularly, for each pixel row the commonly connected transfer transistor and reset transistor gate terminals (node 15 in FIG. 18) are connected to the transfer/reset bus and the select transistor gate terminals (terminal 21 in FIG. 18) are connected to the select bus. Thus, nodes 15 of row 0 are connected to transfer/reset bus $152_0$ and gates terminals 21 of row 0 are connected to select bus $154_0$; nodes 15 of row 1 are connected to transfer/reset bus $152_1$ and gates terminals 21 of row 0 are connected to select bus $154_1$; and nodes 15 of row 2 are connected to transfer/reset bus $152_2$ and gates terminals 21 of row 2 are connected to select bus $154_2$. Voltage $V_{TRRE}$ is applied to transfer/reset busses $152_0$, $152_1$, and $152_2$, and voltage $V_{SEL}$ is applied to select busses $154_0$, $154_1$, and $154_2$. The source terminals of each select transistor in a column of pixels is connected to a corresponding column 74A, 74B, and 74C. Each column may be coupled to a precharge transistor (not shown) for operation in current starvation mode in which the columns are precharged before sampling and where the sampling occurs without an active current load. Alternatively, each column may be coupled for receiving a bias current from a voltage controlled current sink. More particularly, for each pixel row the commonly connected transfer transistor and reset transistor gate terminals (node 15 in FIG. 1) are connected to the transfer/reset bus and the select transistor gate terminals (terminal 21 in FIG. 14) are connected to the select bus. The source terminals of the each select transistor for the pixel row are coupled for receiving a bias current from a corresponding current sink $I_{COL}$. Voltage $V_{TRRE}$ is applied to the transfer/reset bus and voltage $V_{SEL}$ is applied to the select bus. The drains of reset transistors 16 are coupled for receiving a voltage $V_{DD\_PIX}$ and the drains of source follower transistors 18 are coupled for receiving pulsed source of operating potential $V_{DD}$.

Like the array of pixels 150 comprising a plurality of pixels 10, the array 302 of pixels 300 can operate in a rolling shutter operating mode or a snapshot operating mode. In both the rolling shutter and the snapshot operating modes, photodiodes 12 and floating diffusion capacitors 24 are reset before integration. In the rolling shutter operating mode, photodiodes 12 and floating diffusion capacitors 24 in a first row, e.g., row 0, are reset by applying a voltage $V_{TRRE}$ to transfer/reset bus $152_0$ and thus to nodes 15, i.e., the common gates of transfer transistors 14 and reset transistors 16. After row 0 is reset each subsequent row is reset in sequence, for example, row 1, row 2, etc. The sequence for resetting the rows of pixels is not a limitation of the present invention. For example, resetting can first occur on a row other than row 0 and may occur out of sequence, i.e., row 2 may be reset after row 0 or row 0 may be reset after row 1. Resetting the rows discharges photodiodes 12 and floating diffusion capacitors 24.

Figure 23:
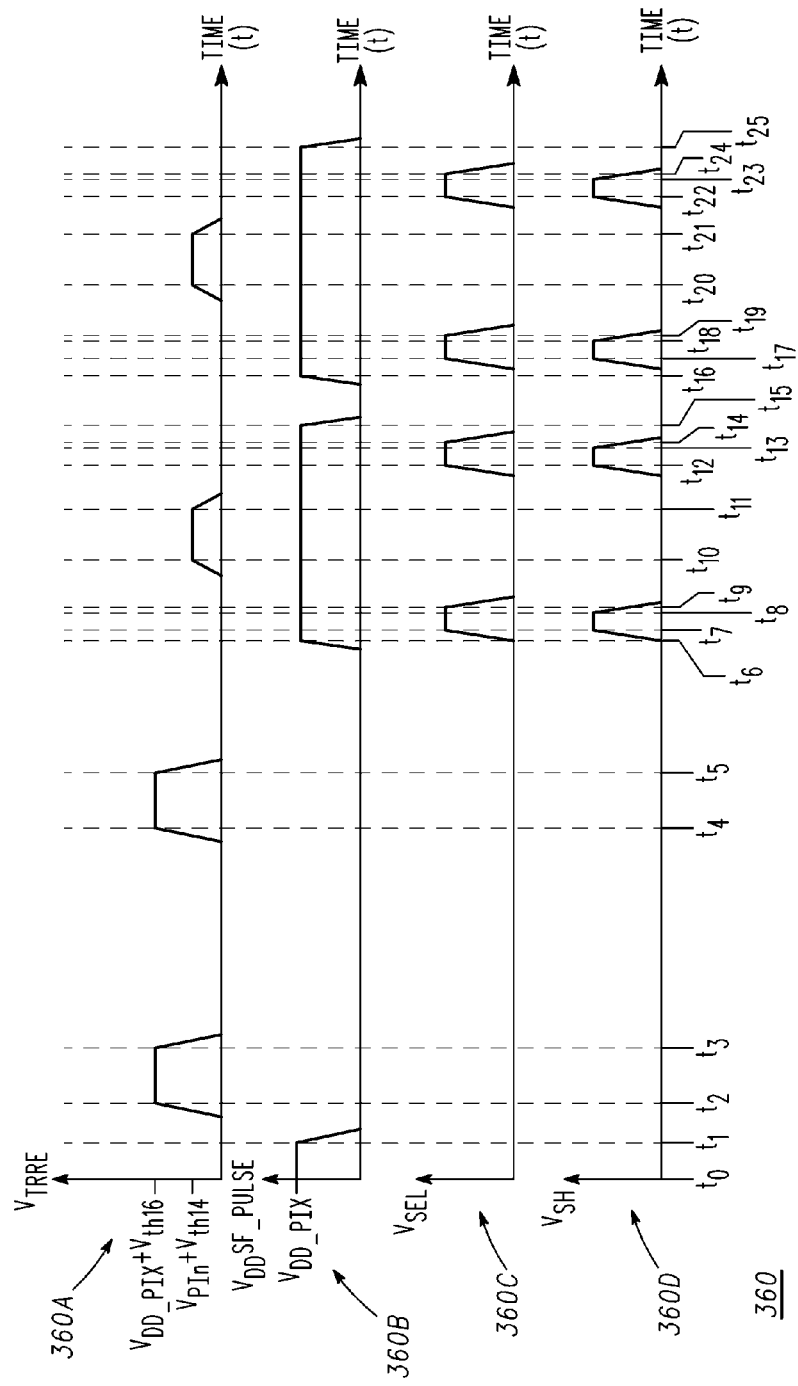
FIG. 23 is a timing diagram of operation of the pixel array of FIG. 21 in a rolling shutter mode of operation in accordance with another embodiment of the present invention.

FIG. 23 is a timing diagram 360 for operation in the rolling shutter mode in accordance with an embodiment of the present invention. Timing diagram 360 includes plots 360A, 360B, 360C, and 360D. At time $t_0$, the drain voltage of reset transistor 16 is at a voltage level $V_{DD\_PIX}$ and at time $t_1$ the drain voltage transitions from voltage level $V_{DD\_PIX}$ to about zero volts. The photodiodes 12 and floating diffusion capacitors 24 of row 0 are reset or discharged by raising voltage $V_{TRRE}$ to a voltage that is greater than or equal to voltage $V_{DD\_PIX}+V_{th16}$ at time $t_2$. At time $t_3$, photodiodes 12 and floating diffusion capacitors 24 are sufficiently discharged, thus voltage $V_{TRRE}$ transitions to about zero volts. The photodiodes 12 and floating diffusion capacitors 24 of row 1 are reset or discharged by raising voltage $V_{TRRE}$ of transfer/reset bus $152_1$ to a voltage that is greater than or equal to voltage $V_{DD\_PIX}+V_{th16}$ at time $t_4$. At time $t_5$, photodiodes 12 and floating diffusion capacitors 24 are sufficiently discharged, thus voltage $V_{TRRE}$ transitions to about zero volts. This process continues until each of the rows of photodiodes 12 and floating diffusion capacitors 24 have been reset. Although only three rows and three columns are shown in FIG. 19 and only resetting of row 0 and row 1 have been shown in plot 360A, it should be understood that the number of rows and columns is not a limitation of the present invention and that preferably each row of photodiodes 12 and floating diffusion capacitors 24 is reset.

At time $t_6$, the voltage at the drain of reset transistor 16 transitions to a voltage level of about voltage $V_{DD\_PIX}$. At time $t_7$, select voltage $V_{SEL}$ is applied to row selector bus $154_0$ and a voltage $V_{SH}$ asserts column 74A so that the floating diffusion voltage at node 22 can be read, i.e., select voltage $V_{SEL}$ and voltage $V_{SH}$ transition to logic high voltage levels $V_H$. After reading out the floating diffusion voltage, voltage $V_{SH}$ transitions to a logic low voltage $V_L$ at time $t_8$ and select voltage $V_{SEL}$ transitions to a logic low voltage $V_L$ at time $t_9$.

At time $t_{10}$, voltage $V_{TRRE}$ is at a voltage that is greater than or equal to voltage $V_{PIN}+V_{th14}$. More particularly, voltage $V_{TRRE}$ transitions to a voltage that is greater than or equal to voltage $V_{PIN}+V_{th14}$ and less than voltage $V_{DD\_PIX}+V_{th16}$ thereby transferring the charge from photodiodes 12 associated with row 0 to floating diffusion capacitors 24 associated with row 0. At time $t_{11}$, voltage $V_{TRRE}$ transitions to about zero volts. Maintaining voltage $V_{TRRE}$ at a level that is greater than or equal to voltage $V_{PIN}+V_{th14}$ and less than voltage $V_{DD\_PIX}+V_{th16}$ provides a voltage that is sufficient to transfer the charge from the photodiode, but is insufficient to reset photodiodes 12 and diffusion capacitors 24 because pinned photodiodes 12 reset to their depletion or pinning voltage $V_{PIN}$.

At time $t_{12}$, select voltage $V_{SEL}$ is applied to row selector bus $154_0$ and a voltage $V_{SH}$ asserts column 74A so that the floating diffusion voltage at node 22 can be read, i.e., select voltage $V_{SEL}$ and voltage $V_{SH}$ are at logic high voltage level $V_H$. After reading out the floating diffusion voltage, voltage $V_{SH}$ transitions to a logic low voltage $V_L$ at time $t_{13}$ and select voltage $V_{SEL}$ transitions to a logic low voltage $V_L$ at time $t_{14}$. Subtraction circuitry (not shown) subtracts the voltage at common gate node 15 from the voltage read at time $t_{12}$ to remove ktc noise and fixed pattern noise.

At time $t_{15}$, the voltage at the drain of source follower transistor 18 transitions from voltage $V_{DD\_PIX}$ to a lower voltage, which can be, for example, zero volts.

At time $t_{16}$, the voltage at the drain of source follower transistor 18 transitions from about zero volts to a higher voltage which can be $V_{DD\_PIX}$.

At time $t_{17}$, select voltage $V_{SEL}$ is applied to row selector bus $154_1$ and a voltage $V_{SH}$ asserts column 74B so that the floating diffusion voltage at node 22 can be read, i.e., select voltage $V_{SEL}$ and voltage $V_{SH}$ are at logic high voltage levels $V_H$. After reading out the floating diffusion voltage, voltage $V_{SH}$ transitions to a logic low voltage $V_L$ at time $t_{18}$ and select voltage $V_{SEL}$ transitions to a logic low voltage $V_L$ at time $t_{19}$.

At time $t_{20}$, voltage $V_{TRRE}$ is at a voltage that is greater than or equal to voltage $V_{PIN}+V_{th14}$. More particularly, voltage $V_{TRRE}$ transitions to a voltage that is greater than or equal to voltage $V_{PIN}+V_{th14}$ and less than voltage $V_{DD\_PIX}+V_{th16}$ thereby transferring the charge from photodiodes 12 associated with row 1 to floating diffusion capacitors 24 associated with row 1. At time $t_{21}$, voltage $V_{TRRE}$ transitions to about zero volts. Maintaining voltage $V_{TRRE}$ at a level that is greater than or equal to voltage $V_{PIN}+V_{th14}$ and less than voltage $V_{DD\_PIX}+V_{th16}$ provides a voltage that is sufficient to transfer the charge from the photodiode, but is insufficient to reset photodiodes 12 and floating diffusion capacitors 24 because pinned photodiodes 12 reset to their depletion or pinning voltage $V_{PIN}$.

At time $t_{22}$, select voltage $V_{SEL}$ is applied to row selector bus $154_1$ and a $V_{SH}$ asserts column 74B so that the floating diffusion voltage at node 22 can be read, i.e., select voltage $V_{SEL}$ and voltage $V_{SH}$ transition to logic high voltage levels $V_H$. After reading out the floating diffusion voltage, voltage $V_{SH}$ transitions to a logic low voltage $V_L$ at time $t_{23}$ and select voltage $V_{SEL}$ transitions to a logic low voltage $V_L$ at time $t_{24}$. Subtraction circuitry (not shown) subtracts the voltage read out during the time period from time $t_7$ to time $t_9$ and the voltage read at time $t_{22}$ to remove ktc noise and fixed pattern noise.

At time $t_{25}$, the voltage at the drain of reset transistor 16 transitions from voltage $V_{DD\_PIX}$ to a lower voltage which can be, for example, zero volts.

It should be noted that the pulse $V_{TRRE}$ between times $t_2$ and $t_3$ correspond to resetting row 0 and the pulse between times $t_4$ and $t_5$ correspond to resetting row 1. The pulses between times $t_3$ and $t_{11}$ correspond to selecting and transferring data from row 0 and the pulses between times $t_5$ and $t_{21}$ correspond to selecting and transferring data from row 1. This process continues for each row in the pixel array. Preferably, the time period between times $t_3$ and $t_{11}$ is the same as the time for the time period between times $t_5$ and $t_{21}$. These time periods represent the integration time for the corresponding TOWS.

Figure 24:
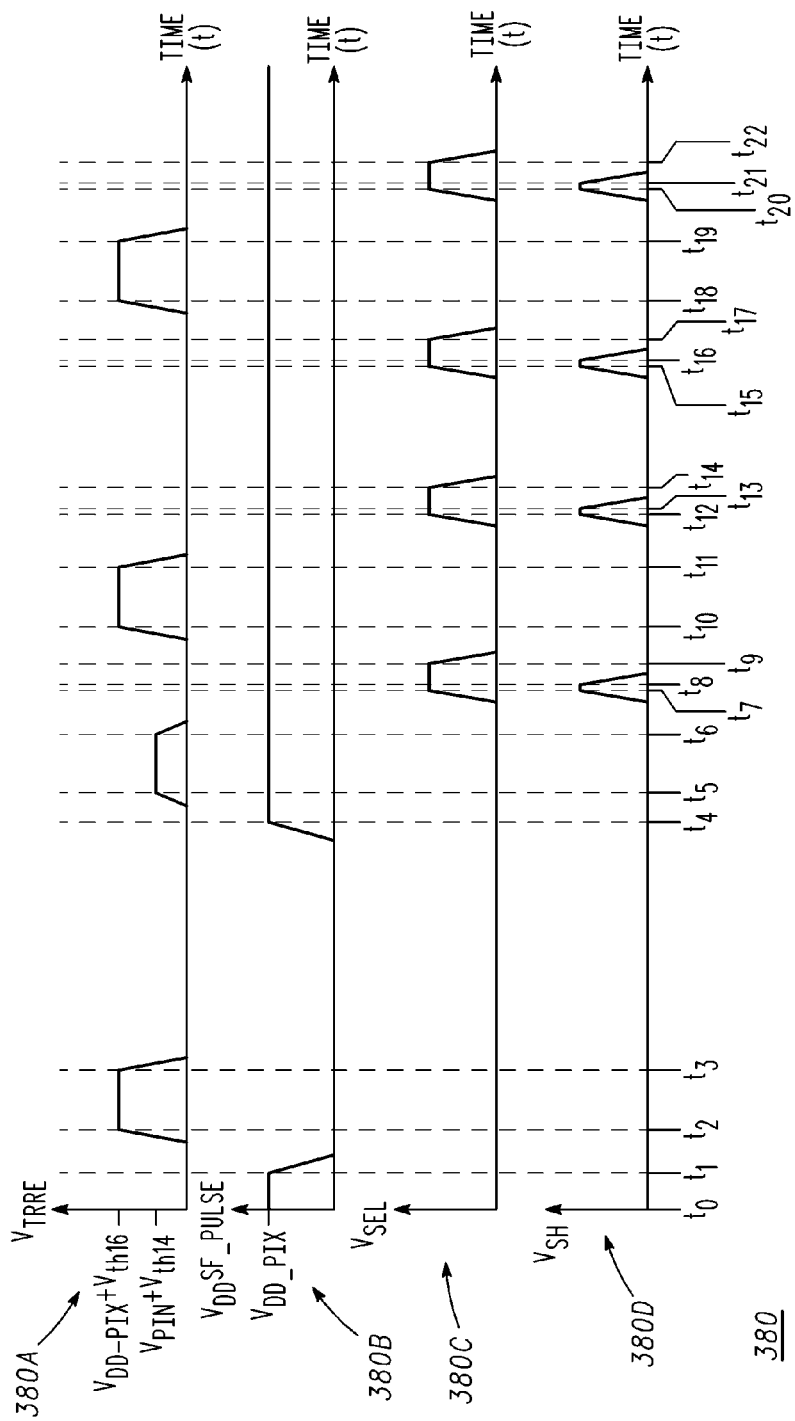
FIG. 24 is a timing diagram of operation of the pixel array of FIG. 21 in a snapshot mode of operation in accordance with another embodiment of the present invention.

FIG. 24 is a timing diagram 380 for operation in the snap-shot mode in accordance with an embodiment of the present invention. Timing diagram 380 includes plots 380A, 380B, 380C, and 380D. At time $t_0$, the drain voltage of reset transistor 16 is at a voltage level $V_{DD\_PIX}$ and at time $t_1$ the drain voltage transitions from voltage level $V_{DD\_PIX}$ to about zero volts. The photodiodes 12 and floating diffusion capacitors 24 for all the pixels are reset or discharged by raising voltage $V_{TRRE}$ to a voltage that is greater than or equal to voltage $V_{DD\_PIX}+V_{th16}$ at time $t_2$. At time $t_3$, photodiodes 12 and floating diffusion capacitors 24 are sufficiently discharged, thus voltage $V_{TRRE}$ transitions to about a zero voltage level.

At time $t_4$, the drain voltage of select transistor 16 has transitioned from about zero volts to about a voltage level $V_{DD\_PIX}$. $V_{TRRE}$ transitions to a voltage that is greater than or equal to voltage $V_{PIN}+V_{th14}$.

At time $t_5$, voltage $V_{TRRE}$ is at a voltage that is greater than or equal to voltage $V_{PIN}+V_{th14}$. More particularly, voltage $V_{TRRE}$ transitions to a voltage that is greater than or equal to voltage $V_{PIN}+V_{th14}$ and less than voltage $V_{DD\_PIX}+V_{th16}$ thereby globally transferring the charge from photodiodes 12 to floating diffusion capacitors 24 without resetting photodiodes 12 or floating diffusion capacitors 24. At time $t_6$, voltage $V_{TRRE}$ transitions to about zero volts.

At time $t_7$, select voltage $V_{SEL}$ is applied to row selector bus $154_0$ and a voltage $V_{SH}$ asserts column 74A so that the floating diffusion voltage at node 22 can be read, i.e., select voltage $V_{SEL}$ and voltage $V_{SH}$ transition to logic high voltage levels $V_H$. After reading out the floating diffusion voltage, voltage $V_{SH}$ transitions to a logic low voltage $V_L$ at time $t_8$ and select voltage $V_{SEL}$ transitions to a logic low voltage $V_L$ at time $t_9$.

At time $t_{10}$, voltage $V_{TRRE}$ has transitioned to a voltage that is greater than or equal to voltage $V_{DD\_PIX}+V_{th16}$, which resets photodiodes 12 and floating diffusion capacitors 24. At time $t_{11}$, photodiodes 12 and floating diffusion capacitors 24 are sufficiently discharged, thus voltage $V_{TRRE}$ transitions to about zero volts.

At time $t_{12}$, select voltage $V_{SEL}$ is applied to row selector bus $154_0$ and a voltage $V_{SH}$ asserts column 74A so that the floating diffusion voltage at node 22 can be read, i.e., select voltage $V_{SEL}$ and voltage $V_{SH}$ transition to logic high voltage levels $V_H$. After reading out the floating diffusion voltage, voltage $V_{SH}$ transitions to a logic low voltage $V_L$ at time $t_{13}$ and select voltage $V_{SEL}$ transitions to a logic low voltage $V_L$ at time $t_{14}$.

At time $t_{15}$, select voltage $V_{SEL}$ is applied to row selector bus $154_1$ and at time $t_{16}$ a voltage $V_{SH}$ asserts column 74B so that the floating diffusion voltage at node 22 can be read, i.e., select voltage $V_{SEL}$ and voltage $V_{SH}$ have transitioned to logic high voltage levels $V_H$. Voltage $V_{SH}$ transitions to a logic low voltage level $V_L$ at time $t_{16}$ and select voltage $V_{SEL}$ transitions to a logic low voltage level $V_L$ at time $t_{17}$.

At time $t_{18}$, voltage $V_{TRRE}$ has transitioned to a voltage that is greater than or equal to voltage $V_{DD\_PIX}+V_{th16}$, which resets photodiodes 12 and floating diffusion capacitors 24. At time $t_{19}$, voltage $V_{TRRE}$ transitions to about zero volts.

At time $t_{20}$, select voltage $V_{SEL}$ is applied to row selector bus $154_1$ and at time $t_{22}$ a voltage $V_{SH}$ which asserts column 74B so that the floating diffusion voltage at node 22 can be read, i.e., select voltage $V_{SEL}$ and voltage $V_{SH}$ have transitioned to logic high voltage levels $V_H$. Voltage $V_{SH}$ transitions to a logic low voltage level $V_L$ at time $t_{21}$ and select voltage $V_{SEL}$ transitions to a logic low voltage level $V_L$ at time $t_{22}$.

It should be appreciated that the pulse widths of pulses $V_{SH}$ are may be wider than shown in FIG. 24.

Figure 25:
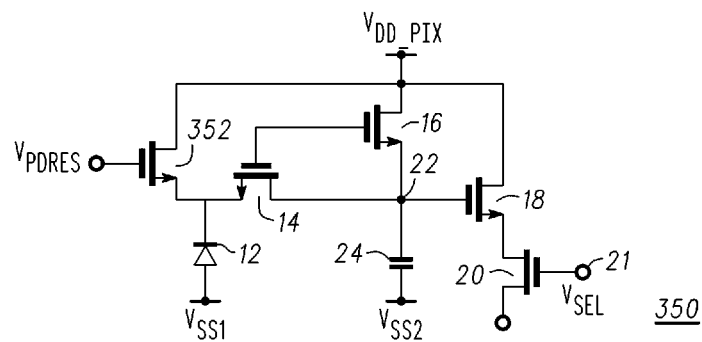
FIG. 25 is a circuit schematic of a pixel in accordance with another embodiment of the present invention.

FIG. 25 is a circuit schematic of a pixel 350 in accordance with another embodiment of the present invention. Pixel 350 is similar to pixel 10 except that a transistor 352 is coupled between source of operating potential $V_{DD\_PIX}$ and photodiode 12. The drain of photodiode reset transistor 352 is commonly connected to the drains of reset transistor 16 and source follower transistor 18, the source of photodiode reset transistor 352 is connected to the cathode of photodiode 12, and the gate of photodiode reset transistor 352 is coupled for receiving a reset signal $V_{PDRES}$.

Figure 26:
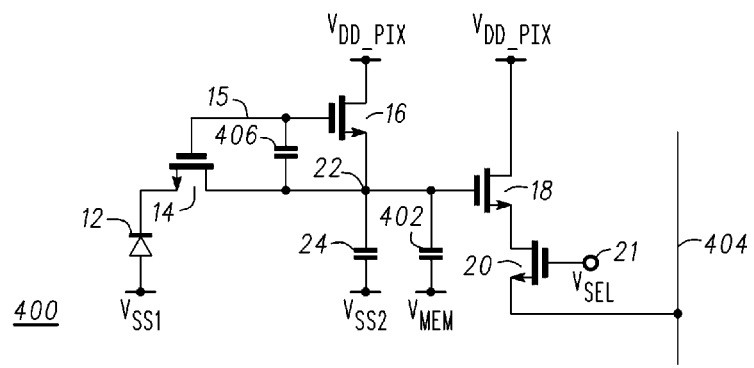
FIG. 26 is a circuit schematic of a pixel in accordance with another embodiment of the present invention.

FIG. 26 is a circuit schematic of a pixel 400 in accordance with another embodiment of the present invention. Pixel 400 is pixel 10 shown in FIG. 2 except that a memory element 402 is connected between the gate of source follower transistor 18 and a pulsed source of potential $V_{MEM}$. By way of example, memory element 402 is a capacitor. The source of select transistor 20 is connected to a column 404. In addition, the circuit schematic of pixel 400 includes a parasitic gate to source capacitance 406. Capacitor 402 increases the diffusion voltage prior to the transfer of charge from photodiode 12 to floating diffusion capacitor 24.

By now it should be appreciated that a pixel and a method for transferring charge to voltage in the pixel have been provided.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A pixel, comprising:
a reset transistor having a control electrode and first and second current carrying electrodes;
a transfer transistor having a control electrode and first and second current carrying electrodes, wherein the control electrode of the transfer transistor is coupled to the control electrode of the reset transistor, and the first current carrying conductor of the transfer transistor is coupled to the second current carrying transistor of the reset transistor and forms a first node.

2. The pixel of claim 1, further including a source follower transistor having a control electrode and first and second current carrying electrodes, wherein the control electrode is coupled to the first current carrying electrode of the transfer transistor and to the second current carrying electrode of the reset transistor.

3. The pixel of claim 2, wherein the first current carrying electrode of the reset transistor and the first current carrying electrode of the source follower transistor are coupled for receiving a first source of operating potential.

4. The pixel of claim 2, wherein the first current carrying electrode of the reset transistor is coupled for receiving a first source of operating potential and the first current carrying electrode of the source follower transistor is coupled for receiving a second source of operating potential.

5. The pixel of claim 1, further including a select transistor having a control electrode and first and second current carrying electrodes, the first current carrying electrode coupled to the second current carrying electrode of the source follower transistor.

6. The pixel of claim 1, further including a pinned photodiode coupled to the second current carrying conductor of the transfer transistor.

7. The pixel of claim 1, further including a floating diffusion capacitor coupled to the first node.

8. A pixel, comprising:
a photodiode having an anode and a cathode;
a first switch having a control terminal and first and second current carrying terminals, the first current carrying terminal coupled to the cathode of the photodiode;
a second switch having a control terminal and first and second current carrying terminals, the first current carrying terminal of the second switch coupled for receiving a first source of operating potential, the second current carrying terminal of the second switch coupled to the second current carrying terminal of the first switch, and the control terminal of the second switch coupled to the control terminal of the first switch;
a third switch having a control terminal and first and second current carrying terminals, the first current carrying terminal of the third switch coupled to the second current carrying terminals of the first and second switches;
an amplifier having an input coupled to the second current carrying terminal of the third switch; and
a memory element coupled to the second current carrying terminal of the first switch.

9. The pixel of claim 8, wherein the memory element is a floating diffusion capacitor.

10. The pixel of claim 8, wherein the amplifier is a transistor configured as a source follower.

11. The pixel of claim 8, wherein the first, second, and third switches are comprised of first, second, and third transistors, respectively.

12. A method, comprising:
providing the plurality of pixels, wherein pixels of the plurality of pixels each include first, second, third, and fourth transistors, a photodiode, and a floating diffusion capacitor, wherein each transistor has a control electrode and first and second current carrying electrodes, the control electrodes of the first and second transistors commonly coupled together, the first current carrying electrode of the second transistor coupled to the second current carrying electrode of the first transistor and to the control electrode of the third transistor, and the second current carrying electrode of the third transistor coupled to the first current carrying electrode of the fourth transistor, the photodiode coupled to the second current carrying electrode of the second transistor, and the floating diffusion capacitor coupled to the second current carrying electrode of the first transistor;
resetting the photodiode and the floating diffusion capacitor by applying a first voltage that is greater than a first voltage level to the commonly connected control electrodes of the first and second transistors; and
transferring charge from the photodiode to the floating diffusion capacitance by applying a second voltage that is less than the first voltage level to the commonly connected control electrodes of the first and second transistors.

13. The method of claim 12, further including coupling the first current carrying electrode of the first transistor for receiving a first source of operating potential and wherein the first voltage level is greater than a voltage level of the first source of operating potential.

14. The method of claim 13, wherein the second voltage has a level that is less than the first voltage level and greater than a pinning voltage of the photodiode.

* * * * *